(12) United States Patent
Barter et al.

(10) Patent No.: US 12,160,691 B2
(45) Date of Patent: Dec. 3, 2024

(54) PULSE SHAPING TO REDUCE PULSE HISTORY EFFECTS IN PULSED LASERS

(71) Applicant: Microsoft Technology Licensing, LLC, Redmond, WA (US)

(72) Inventors: Thomas Hamish Barter, Seattle, WA (US); John Allen Tardif, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 18/113,600

(22) Filed: Feb. 23, 2023

(65) Prior Publication Data

US 2023/0208093 A1 Jun. 29, 2023

Related U.S. Application Data

(63) Continuation of application No. 16/869,825, filed on May 8, 2020, now Pat. No. 11,594,852.

(51) Int. Cl.
*H04N 9/31* (2006.01)
*G02B 26/08* (2006.01)
*G02B 26/10* (2006.01)
*G02B 27/01* (2006.01)
*H01S 3/131* (2006.01)

(52) U.S. Cl.
CPC ....... *H04N 9/3155* (2013.01); *G02B 26/0833* (2013.01); *G02B 26/10* (2013.01); *G02B 27/0172* (2013.01); *H01S 3/131* (2013.01)

(58) Field of Classification Search
CPC .............. H04N 9/3155; H04N 9/3129; G02B 26/0833; G02B 26/10; G02B 27/0172; H01S 3/131
See application file for complete search history.

(56) References Cited

U.S. PATENT DOCUMENTS 5,400,351 A 3/1995 Montgomery et al.
8,605,764 B1 12/2013 Rothaar et al.
(Continued)

OTHER PUBLICATIONS

"International Search Report and Written Opinion Issued in PCT Application No. PCT/US2021/022452", Mailed Date: Jun. 7, 2021, 14 Pages.
(Continued)

*Primary Examiner* — Stephen G Sherman
(74) *Attorney, Agent, or Firm* — Calfee, Halter & Griswold LLP (57) ABSTRACT

Technologies pertaining to accounting for pulse history effects are described herein. In connection with accounting for pulse history effects, an amount of time between a first current pulse and a second current pulse that are to be transmitted to a pulsed laser is determined. Based upon such an amount of time, a determination is made as to whether a porch pulse is to be prepended to the second current pulse. When the porch pulse is to be prepended to the second current pulse, an amplitude and duration of the porch pulse are computed based upon the amount of time. The porch pulse is transmitted to the pulsed laser immediately followed by the second current pulse, wherein the porch pulse precharges the pulsed laser for emitting a pulse of light based upon the second current pulse.

20 Claims, 8 Drawing Sheets

(56) References Cited

U.S. PATENT DOCUMENTS

| | | |
|---|---|---|
| 8,750,341 B2 | 6/2014 | Bazzani et al. |
| 2006/0114271 A1 | 6/2006 | Takeda |
| 2007/0086495 A1 | 4/2007 | Sprague et al. |
| 2009/0028199 A1 | 1/2009 | Brown et al. |
| 2009/0175302 A1 | 7/2009 | Bazzani et al. |
| 2010/0103663 A1* | 4/2010 | Kubis .................. H05B 45/56 362/231 |
| 2017/0227764 A1* | 8/2017 | Kim .................. G02B 27/0103 |
| 2019/0097393 A1 | 3/2019 | Moench et al. |
| 2019/0123512 A1 | 4/2019 | Gudaitis et al. |
| 2021/0335171 A1 | 10/2021 | Barter et al. |
| 2021/0351557 A1 | 11/2021 | Barter et al. |

OTHER PUBLICATIONS

"Office Action for U.S. Appl. No. 16/869,825", Mailed Date: May 13, 2022, 7 pages.

"Response to the Office Action for U.S. Appl. No. 16/869,825", Filed Date: Oct. 13, 2022, 9 pages.

"Notice of Allowance and Fees Due for U.S. Appl. No. 16/869,825", Mailed Date: Nov. 3, 2022, 5 pages.

* cited by examiner

PULSE SHAPING TO REDUCE PULSE HISTORY EFFECTS IN PULSED LASERS

RELATED APPLICATION

This application is a continuation of U.S. patent application Ser. No. 16/869,825, filed on May 8, 2020, and entitled "PULSE SHAPING TO REDUCE PULSE HISTORY EFFECTS IN PULSED LASERS", the entirety of which is incorporated herein by reference.

BACKGROUND

A scanned laser display is a type of display technology whereby light emitted from lasers is projected onto a display surface in a scanning manner, thereby forming visual images. More specifically, in a scanned laser display, a pulse of electrical current is provided to a pulsed laser (e.g., a red, green, or blue pulsed laser), and the pulsed laser emits light (having a certain luminance) towards the display surface. A mirror included in a microelectromechanical system (MEMS) directs the light towards a point on the display surface, wherein the point corresponds to a pixel in imagery that is presented on the display surface. Luminance of the light emitted by the pulsed laser is based upon an amplitude of the pulse of electrical current. In comparison to other display technologies, scanned laser displays have low power requirements, are capable of high levels of luminance, emit little electromagnetic radiation, can be packaged in small form factors, and present visual images that tend not to strain the human eye. As such, scanned laser displays are useful in lightweight head mounted displays, such as augmented reality (AR) or virtual reality (VR) headsets.

Due to the inherent non-linear behavior of lasers, precise control of luminance in a scanned laser display is challenging. More specifically, pulse history effects present challenges to precise control of luminance. Pulse history effects cause luminance of light emitted by the pulsed laser to be affected by parameters of each pulse of electrical current previously provided to the pulsed laser. Thus, a scanned laser display may drive a pulsed laser with a pulse of electrical current having an amplitude that, in the absence of pulse history effects, is expected to cause the pulsed laser to produce light of a first luminance; however, due to pulse history effects, the actual light produced by the pulsed laser may have a second luminance that is different from the first luminance. With more particularity, a pulsed laser initially biased below a lasing threshold has a delayed optical response to a current pulse driven above the lasing threshold. The net effect of this "turn-on delay" is a luminance of the light emitted by the pulsed laser that is below an expected luminance given an amplitude of the current pulse, and therefore color and/or luminance of a pixel that is different from an expected color and/or luminance.

Conventional scanned laser displays fail to account for pulse history effects when driving pulsed lasers of such displays. Due to the failure to account for pulse history effects, pixels in an image presented on a display of a scanned laser display may be brighter or darker than what is desired and/or may have a color that is somewhat different from what is desired.

SUMMARY

The following is a brief summary of subject matter that is described in greater detail herein. This summary is not intended to be limiting as to the scope of the claims.

Described herein are various technologies pertaining to scanned laser displays. With more specificity, a display system is described herein that is configured to account for pulse history effects on a pulse of light emitted by a pulsed laser by prepending a porch pulse to a current pulse used to drive the pulsed laser, wherein at least one of an amplitude or a duration of the porch pulse is based upon an amount of time between a trailing edge of a previously emitted current pulse and a leading edge of the current pulse. The porch pulse accounts for the pulse history effects such that the pulse of light emitted by the pulsed laser has a desired luminance.

The display system comprises an energy source (such as a battery), pulse circuitry, a pulsed laser, control circuitry, and a display surface. Electrical current is drawn from the energy source and is received by the pulse circuitry. The control circuitry controls the pulse circuitry to output a first current pulse based upon the electrical current drawn from the energy source. The pulsed laser receives the first current pulse and emits a first pulse of light based upon the first current pulse, and as a result a first pixel of imagery is presented on the display surface based upon the first pulse of light.

The control circuitry computes or receives an amount of time between a trailing edge of the first current pulse and a leading edge of a second current pulse that is to be transmitted to the pulsed laser subsequent to the first current pulse being transmitted to the pulsed laser. The control circuitry determines whether the computed amount of time is below or above a predefined threshold value. When the amount of time is below the predefined threshold value, the first current pulse pre-charges the pulsed laser a sufficient amount such that a porch pulse is unnecessary, and current level, between the first current pulse and the second current pulse, is driven to a bias current of the pulsed laser. The control circuitry then causes the pulse circuitry to transmit the second current pulse to the pulsed laser. The pulsed laser receives the second current pulse and emits a second pulse of light based upon the second current pulse, and as a result a second pixel of imagery is presented on the display surface based upon the second pulse of light.

However, when the amount of time between the trailing edge of the first current pulse and the leading edge of the second current pulse is above the predefined threshold value, the control circuitry computes at least one of an amplitude of a porch pulse or a duration of the porch pulse based upon the amount of time between the trailing edge of the first current pulse and the leading edge of the second current pulse that is to be transmitted to the pulsed laser. In another example, the at least one of the amplitude of the porch pulse or the duration of the porch pulse may additionally or alternatively be based upon an estimated junction temperature of the pulsed laser. The porch pulse is a current pulse that is to be transmitted to the pulsed laser by the pulse circuitry subsequent to the pulse circuitry transmitting the first current pulse to the pulsed laser, but prior to the pulse circuitry transmitting the second current pulse to the pulsed laser. The porch pulse, when emitted by the pulse circuitry, is prepended to the second current pulse such that the porch pulse has a leading edge. Generally, the longer the amount of time between the trailing edge of the first current pulse and the leading edge of the second current pulse, the longer the duration of the porch pulse and the greater the amplitude of the porch pulse computed by the control circuitry (such that the pulsed laser is effectively "pre-charged" prior to emitting a pulse of light based upon the second current pulse). In another exemplary embodiment, the amplitude of porch pulses emitted by the pulse circuitry can be predefined, in which case actions described below based upon the compute amplitude can be undertaken based upon the predefined amplitude.

The control circuitry performs a comparison between the computed amplitude of the porch pulse and an amplitude of the second current pulse that is to be transmitted to the pulsed laser. When the computed amplitude of the porch pulse is greater than the amplitude of the second current pulse, the control circuitry sets the amplitude of the porch pulse to be equal to the amplitude of the second current pulse. When the computed amplitude of the porch pulse is less than the amplitude of the second current pulse, the control circuitry sets the amplitude of the porch pulse to be equal to the computed amplitude. The control circuitry causes the pulse circuitry to transmit the porch pulse to the pulsed laser.

The control circuitry causes the pulse circuitry to transmit the second current pulse to the pulsed laser subsequent to the pulse circuitry transmitting the porch pulse to the pulsed laser. As noted above, the porch pulse is prepended to the second current pulse, and current provided to the pulsed laser is set at a bias current of the pulsed laser subsequent to the first current pulse being transmitted to the pulsed laser and prior to the porch pulse being transmitted to the pulsed laser. The pulsed laser emits the second pulse of light based upon the porch pulse and the second current pulse, and a second pixel of imagery is presented on the display surface based upon the second pulse of light.

The above-described display system exhibits various advantages over conventional scanned laser displays. First, by correcting for pulse history effects, the display system enables pixels on the display surface to be displayed with desired luminance and color. Second, the above-described display system is computationally efficient and can be incorporated into an active video system, such as one found in an augmented reality (AR) or virtual reality (VR) headset. Third, the above-described display system does not require significant changes to underlying hardware of scanned laser displays in order to function. Fourth, by failing to utilize a porch pulse when the amount of time between the trailing edge of the first current pulse and the leading edge of the second current pulse is below the threshold value (thus guaranteeing a return to a bias current level when the amount of time is below the threshold value), fringing is avoided. Fifth, by setting the amplitude of the porch pulse to be equal to the amplitude of the second current pulse when the computed amplitude of the porch pulse is greater than the amplitude of the second current pulse, the above-described display system preserves dynamic range of the pulsed laser in the scanned laser display.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Various technologies pertaining to scanned laser displays are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean serving as an illustration or example of something, and is not intended to indicate a preference.

Pulse history effects present challenges to precise control of luminance in a scanned laser display. More specifically, pulse history effects cause luminance of light emitted by a pulsed laser in a scanned laser display to be affected by parameters of each pulse of electrical current previously provided to the pulsed laser. Thus, a scanned laser display may drive a pulsed laser with a pulse of electrical current having an amplitude that, in the absence of pulse history effects, is expected to cause the pulsed laser to produce light of a first luminance; however, due to pulse history effects, the actual light produced by the pulsed laser may have a second luminance that is different from the first luminance. The resultant pixels on a display surface of the scanned laser display may thus appear brighter or dimmer than what is desired.

To address the aforementioned problem relating to precise control of luminance in a scanned laser display, a display system is described herein that is configured to prepend a porch pulse to a current pulse used to drive the pulsed laser, wherein at least one of an amplitude or a duration of the porch pulse are based upon an amount of time between a trailing edge of a current pulse previously employed to drive the pulsed laser and a leading edge of the current pulse. The amplitude and/or the duration of the porch pulse may be computed in a manner that compensates for pulse history effects on light emitted by the pulsed laser. In an example, when the computed amplitude of the porch pulse is greater than an amplitude of the current pulse, the amplitude of the porch pulse may be set to be equal to the amplitude of the current pulse to preserve dynamic range of the pulsed laser. In another example, the computed amplitude and/or the computed duration may increase as the amount of time between the trailing edge of the previous current pulse and the leading edge of the current pulse increases in order to provide sufficient pre-charging to the pulsed laser. In yet another example, when the amount of time between the trailing edge of the previous current pulse and the leading edge of the current pulse is below a predefined threshold value, the display system may fail to prepend the porch pulse to the current pulse, thus avoiding fringing. Hence, the display system described herein causes pixels (that are based upon light emitted by the pulsed laser) on a display surface to appear with a desired brightness.

Figure 1:
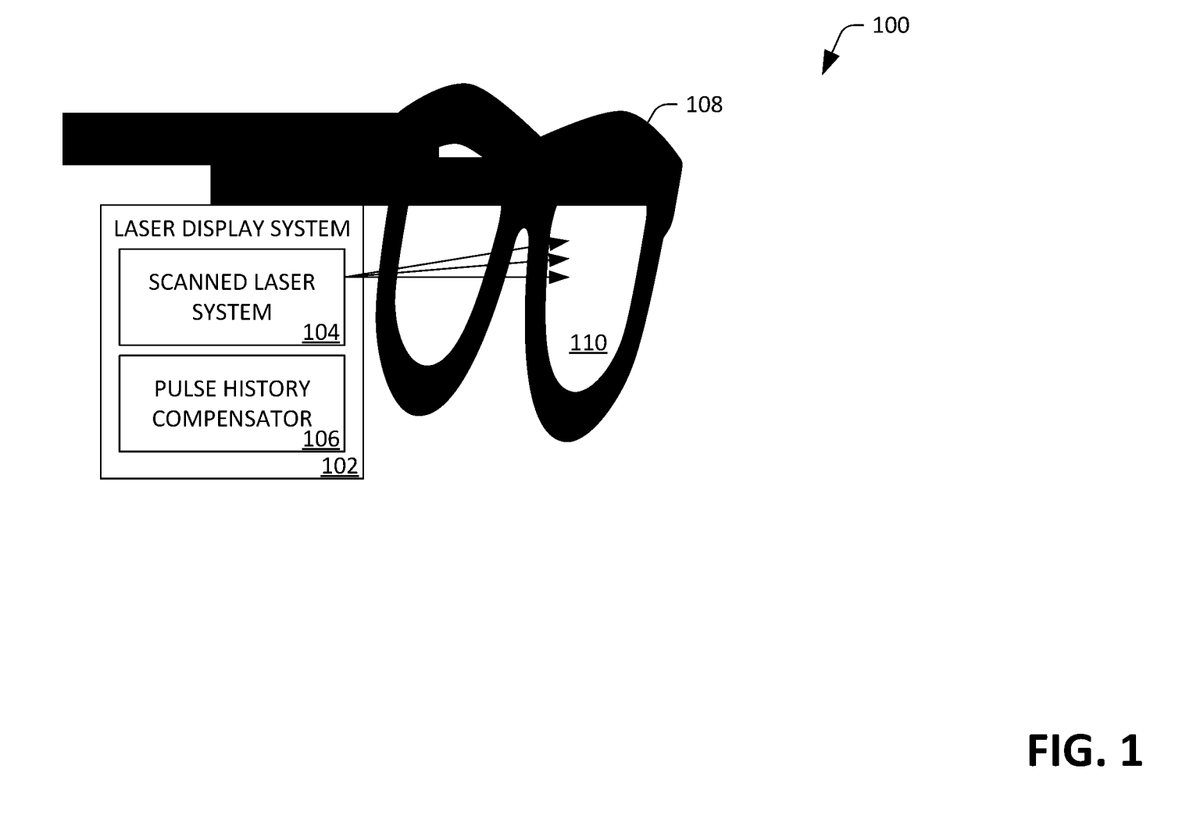
FIG. 1 is a functional block diagram of a head mounted display that corrects for pulse history effects when outputting video imagery.

With reference to FIG. 1, an exemplary display system 100 that accounts for pulse history effects when outputting video imagery is illustrated. The display system 100 comprises a laser display system 102. The laser display system 102 includes a scanned laser system 104. The scanned laser system 104 is configured to emit pulses of light based upon (electrical) current pulses that drive pulsed lasers of the scanned laser system 104, wherein luminance of a pulse of light emitted by a pulsed laser is based upon amplitude of a current pulse. The laser display system 102 further includes a pulse history compensator 106. As will be described in greater detail below, the pulse history compensator 106 is configured to compute parameters of a porch pulse that is to be prepended to a current pulse, wherein the current pulse is to be transmitted to the pulsed laser in the scanned laser system 104. Thus, the scanned laser system 104 and the pulse history compensator 106 work in conjunction with one another to cause pulses of light to be emitted, wherein pulse history effects with respect to the pulsed laser are accounted for such that the pulses of light have a desired luminance. The display system 100 further includes a headset 108 worn by a user (not shown in FIG. 1). The headset 108 includes a display surface 110. Light emitted from the scanned laser system 104 is projected (illustrated by arrows in FIG. 1) towards points on the display surface 110, wherein the light at the points correspond to pixels in imagery presented on the display surface 110.

Figure 2:
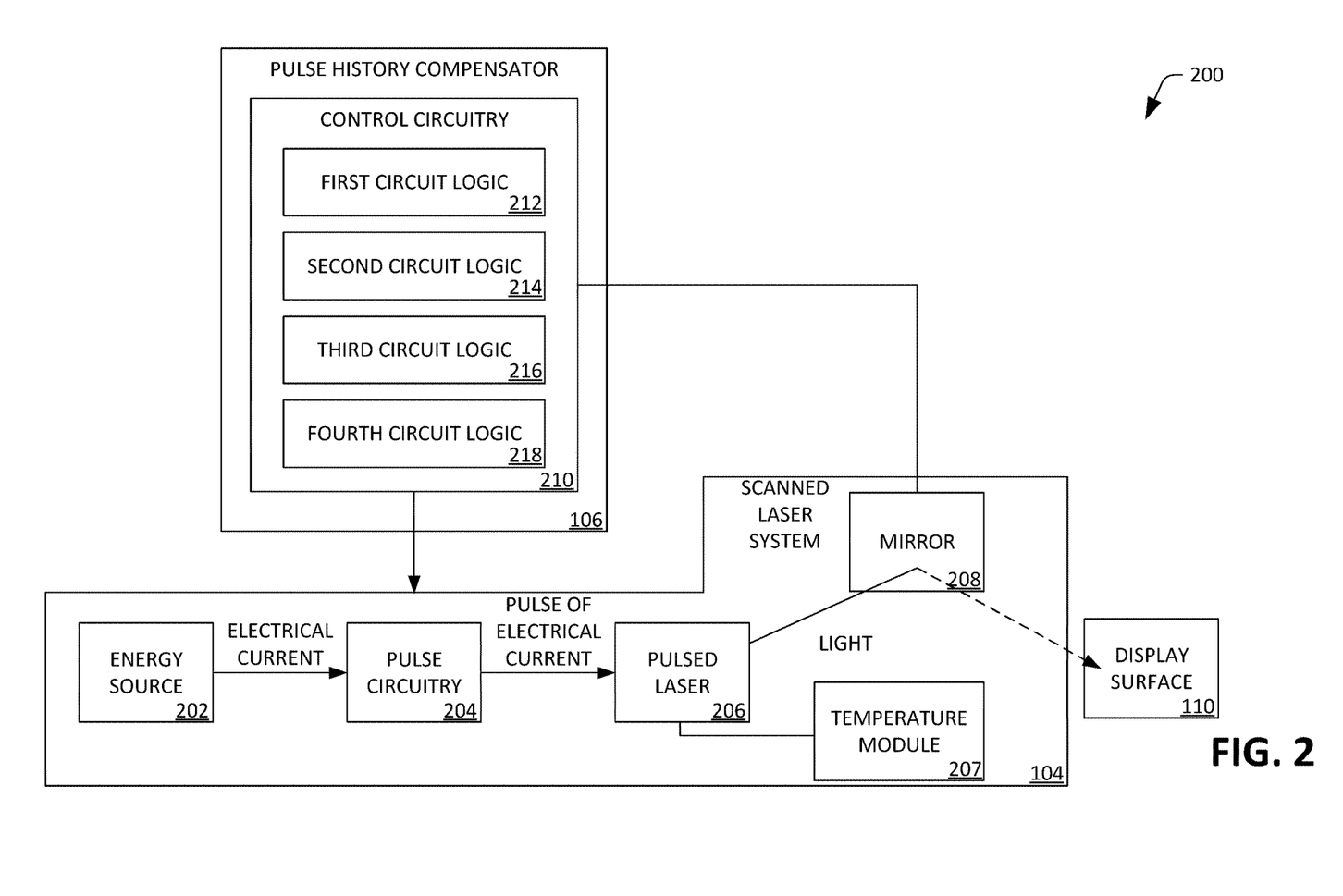
FIG. 2 is a functional block diagram of an exemplary display system that accounts for pulse history effects when outputting video imagery.

Referring now to FIG. 2, an exemplary display system 200 that compensates for pulse history effects when outputting video imagery is illustrated. The display system 200 may include or be part of a head-mounted display worn on a head of a user (e.g., the headset 108), such as a virtual reality (VR) headset or an augmented reality (AR) headset. In another example, the display system 200 may be included in a heads-up display, such as one found in a vehicle, where imagery is projected onto a windshield.

The display system 200 comprises the scanned laser system 104. The scanned laser system 104 includes an energy source 202, wherein electrical current can be drawn from the energy source 202. For example, the energy source 202 may be a battery, a photovoltaic cell, a power supply that can be coupled to an outlet, or other suitable energy source. The display system 200 further includes pulse circuitry 204 that is electrically coupled to the energy source 202. The pulse circuitry 204 is configured to output (electrical) current pulses based upon electrical current drawn from the energy source 202 that is received by the pulse circuitry 204, and therefore the pulse circuitry 204 can include capacitors and other circuitry that can be configured to cause the pulse circuitry 204 to emit current pulses with desired pulse shape, amplitude, time between pulses, etc.

The scanned laser system 104 further includes a pulsed laser 206 that is electrically coupled to the pulse circuitry 204. The pulsed laser 206 is configured to receive current pulses output by the pulse circuitry 204 and is further configured to emit pulses of light towards the display surface 110 based upon the current pulses received from the pulse circuitry 204. With respect to a current pulse that drives the pulsed laser 206, luminance of a pulse of light emitted by the pulsed laser 206 is based upon an amplitude of the current pulse. In an embodiment, the pulsed laser 206 may be a laser that is configured to emit red light ("a red laser"), a laser that is configured to emit green light ("a green laser"), or a laser that is configured to emit blue light ("a blue laser"). Although not depicted in FIG. 2, it is to be understood that the scanned laser system 104 may include a plurality of pulsed lasers that comprise multiple red lasers, green lasers, and/or blue lasers. Furthermore, it is to be understood that the scanned laser system 104 may combine red light, green light, and blue light emitted from the plurality of pulsed lasers in order to display many different colors (e.g., purple, orange, yellow, etc.) on the display surface 110.

The display surface 110 is configured to receive pulses of light emitted by the pulsed laser 206. When perceived by an eye of a user of the display system 200, a pixel on the display surface 110 is based upon the pulse of light emitted by the pulsed laser 206 (which in turn is based upon the current pulse output by the pulse circuitry 204 to drive the pulsed laser 206). For instance, the pixel may be part of a frame of video imagery that is presented on the display surface 110. The display surface 110 may be a transparent material or a semi-transparent material (e.g., glass, clear plastic), and may be positioned a short distance (e.g., 1-5 centimeters) from the eye of the user.

The scanned laser system 104 also optionally includes a temperature module 207 that is coupled to the pulsed laser 206. For instance, the temperature module 207 may be or include a thermal probe that is located at or near a junction of the pulsed laser 206. The temperature module 207 is configured to generate an estimated temperature of the junction of the pulsed laser 206.

In an embodiment, the scanned laser system 104 includes a microelectromechanical system (MEMs) that comprises a mirror 208. The mirror 208 is configured to reflect the light emitted by the pulsed laser 206 onto a location on the display surface 110. The mirror 208 may be adjusted to reflect light emitted by the pulsed laser 206 to different locations on the display surface 110 over time. For instance, at a first point in time, the mirror 208 may be positioned to direct light emitted by the pulsed laser 206 to a first location on the display surface 110, and at a second point in time, the mirror 208 may be positioned to direct light emitted by the pulsed laser 206 to a second location on the display surface 110.

The display system 200 further comprises the pulse history compensator 106. In the embodiment illustrated in FIG. 2, the pulse history compensator 106 is an application-specific integrated circuit (ASIC) and includes control circuitry 210 that is electrically coupled to the pulse circuitry 204. In an exemplary embodiment, the control circuitry 210 can be or include a plurality of logic gates that are configured to perform actions described below. More specifically, the control circuitry 210 is configured to control the pulse circuitry 204, such that a current pulse emitted by the pulse circuitry 204 has a desired amplitude, pulse width, rise time, fall time, etc. As will be described in greater detail below, the control circuitry 210 can include circuit logic 212-218, wherein the circuit logic 212-218 is further configured to compute parameters of a porch pulse through use of respective rules that the circuit logic 212-218 is designed to execute, wherein based upon output of the circuit logic 212-218, the control circuitry 210 controls the pulse circuitry 204 such that the pulse circuitry 204 transmits the porch pulse to the pulsed laser 206, wherein the porch pulse is prepended to a current pulse transmitted by the pulse circuitry 204 to the pulsed laser 206.

The first circuit logic 212 executes a return to bias rule. When the first circuit logic 212 executes the return to bias rule, the first circuit logic 212 determines whether an amount of time between a trailing edge of a first current pulse and a leading edge of a second current pulse that is to be transmitted to the pulsed laser 206 is below a threshold value. The amount of time between the trailing edge of the first current pulse and the leading edge of the second current pulse is referred to herein as "a pulse spacing". When the first circuit logic 212 determines that the pulse spacing is below the threshold value, the control circuitry 210 controls the pulse circuitry 204 such that the pulse circuitry 204 transmits the second current pulse to the pulsed laser 206 without prepending the porch pulse thereto (as when the first current pulse closely precedes the second current pulse, the first current pulse provides sufficient pre-charging for the pulsed laser 206). More specifically, when the first circuit logic 212 determines that the pulse spacing is below the threshold value, the control circuitry 210 controls the pulse circuitry 204 such that: 1) the pulse circuitry 204 transmits the first current pulse to the pulsed laser 206; 2) the pulse circuitry 204 emits electrical current having an amplitude at the bias current of the pulsed laser 206 immediately subsequent to transmitting the first current pulse to the pulsed laser; and 3) the pulse circuitry 204 transmits the second current pulse to the pulsed laser 206, wherein the amplitude of current provided to the pulsed laser 206 is at the bias current throughout the pulse spacing. Driving the amplitude of the current at the bias current between the first current pulse and the second current pulse reduces fringing that would otherwise be evident in imagery output by the scanned laser system 104, especially when the pulsed laser 206 has a relatively low junction temperature.

When the first circuit logic 212 determines that the pulse spacing is above the threshold value, the first circuit logic 212, for example, can output a value for the pulse spacing between the first current pulse and the second current pulse, and the second circuit logic 214 and the third circuit logic 216 receive such value.

The second circuit logic 214 executes a porch duration rule, wherein the porch duration rule receives the value output by the first circuit logic 212 as input. Additionally or alternatively, the porch duration rule can receive the (current) estimated junction temperature of the pulsed laser 206 output by the temperature module 207. When the second circuit logic 214 executes the porch duration rule, the second circuit logic 214 computes a duration of a porch pulse that is to be prepended to the second current pulse, wherein the second circuit logic 214 computes the duration of the porch pulse by interpolating between a minimum porch pulse duration and a maximum porch pulse duration based upon: 1) the value for the pulse spacing output by the first circuit logic 212; and/or 2) the estimated junction temperature of the pulsed laser 206 output by the temperature module 207. In another example, the second circuit logic 214 can access a two-dimensional lookup table and ascertain the duration of the porch pulse based upon the value for the pulse spacing and the estimated junction temperature. When the value of the pulse spacing is relatively large, the second circuit logic 214, based upon (for example) the interpolation, can compute a relatively large porch pulse duration; contrarily, when the value is relatively small, the second circuit logic 214, based upon the interpolation, may compute a relatively small porch pulse duration. For instance, when the value for pulse spacing is a first value, the second circuit logic 214, based upon execution of the porch duration rule, can compute the porch pulse duration as being a first duration. When the value for pulse spacing is a second value, the second circuit logic 214, when executing the portion duration rule, can compute the porch pulse duration as being a second duration, wherein the first value is greater than the second value, and further wherein the first duration is greater than the second duration. Further, the second circuit logic 214 can set a predetermined maximum porch duration, such that when the value for pulse spacing is above a second threshold value, the second circuit logic 214 can set the duration of the porch pulse at the predetermined maximum porch duration. In yet another example, as the estimated temperature output by the temperature module 207 increases, the duration of the porch pulse output by the second circuit logic can decrease.

As indicated previously, the third circuit logic 216 can also receive the value for pulse spacing output by the first circuit logic 212, and can optionally receive the estimated temperature of the junction of pulsed laser 206 output by the temperature module 207. The third circuit logic 216 can execute a porch amplitude rule, wherein the porch amplitude rule outputs an amplitude of the porch pulse based upon: the value for pulse spacing output by the first circuit logic 212 and/or the estimated temperature output by the temperature module 207. In an example, the third circuit logic 216 computes the amplitude of the porch pulse by interpolating between a minimum porch pulse amplitude and a maximum porch pulse amplitude based upon: 1) the value for pulse spacing output by the first circuit logic 212; and/or 2) the estimated junction temperature of the pulsed laser 206 output by the temperature module 207. In another example, the second circuit logic 214 can access a two-dimensional lookup table and ascertain the amplitude of the porch pulse based upon the value for the pulse spacing and the estimated junction temperature. When the value for the pulse spacing is relatively large, the third circuit logic 216, based upon the interpolation, can compute a relatively large porch pulse amplitude; contrarily, when the value is relatively small, the third circuit logic 216, based upon the interpolation, can compute a relatively small porch pulse amplitude. For instance, when the value that identifies the duration of the pulse spacing is a first value, the third circuit logic 216, based upon execution of the porch amplitude rule, can compute the porch pulse amplitude as being a first amplitude. When the value that identifies the duration of the pulse spacing is a second value, the third circuit logic 216, when executing the porch amplitude rule, can compute the porch pulse amplitude as being a second amplitude, wherein the first value is greater than the second value, and further wherein the first amplitude is greater than the second amplitude. Further, the second circuit logic 214 can set a predetermined maximum porch amplitude, such that when the value for pulse spacing is above a third threshold value, the second circuit logic 214 can set the amplitude of the porch pulse at the predetermined maximum porch amplitude. In yet another example, as the estimated temperature output by the temperature module 207 increases, the amplitude of the porch pulse output by the second circuit logic can decrease.

The fourth circuit logic 218 can execute a low light rule, wherein the low light rule is triggered when the first circuit logic 212 outputs the value for the pulse spacing. The trigger rule, when executed by the fourth circuit logic 218, ensures that the amplitude of the porch pulse does not exceed the amplitude of the second current pulse. More specifically, the fourth circuit logic 218 can receive: 1) an amplitude of the second current pulse; and 2) the computed amplitude of the porch pulse as output by the third circuit logic 216. When the fourth circuit logic 218 executes the low light rule, the fourth circuit logic 218 determines whether the computed amplitude of the porch pulse is greater than the amplitude of the second current pulse to which the porch pulse is to be prepended. When the computed amplitude of the porch pulse is greater than the amplitude of the second current pulse, the fourth circuit logic 218 sets the amplitude of the porch pulse to be equal to the amplitude of the second current pulse (as opposed to the computed amplitude output by the third circuit logic 216). Therefore, the fourth circuit logic 218 caps the amplitude of the porch pulse at the amplitude of the second current pulse to which the porch pulse is to be prepended, which facilitates preservation of dynamic range of the pulsed laser 206. When the computed amplitude of the porch pulse is less than the amplitude of the second current pulse, the fourth circuit logic 218 sets the amplitude of the porch pulse to be equal to the computed amplitude (as computed by the third circuit logic 216).

Figure 3:
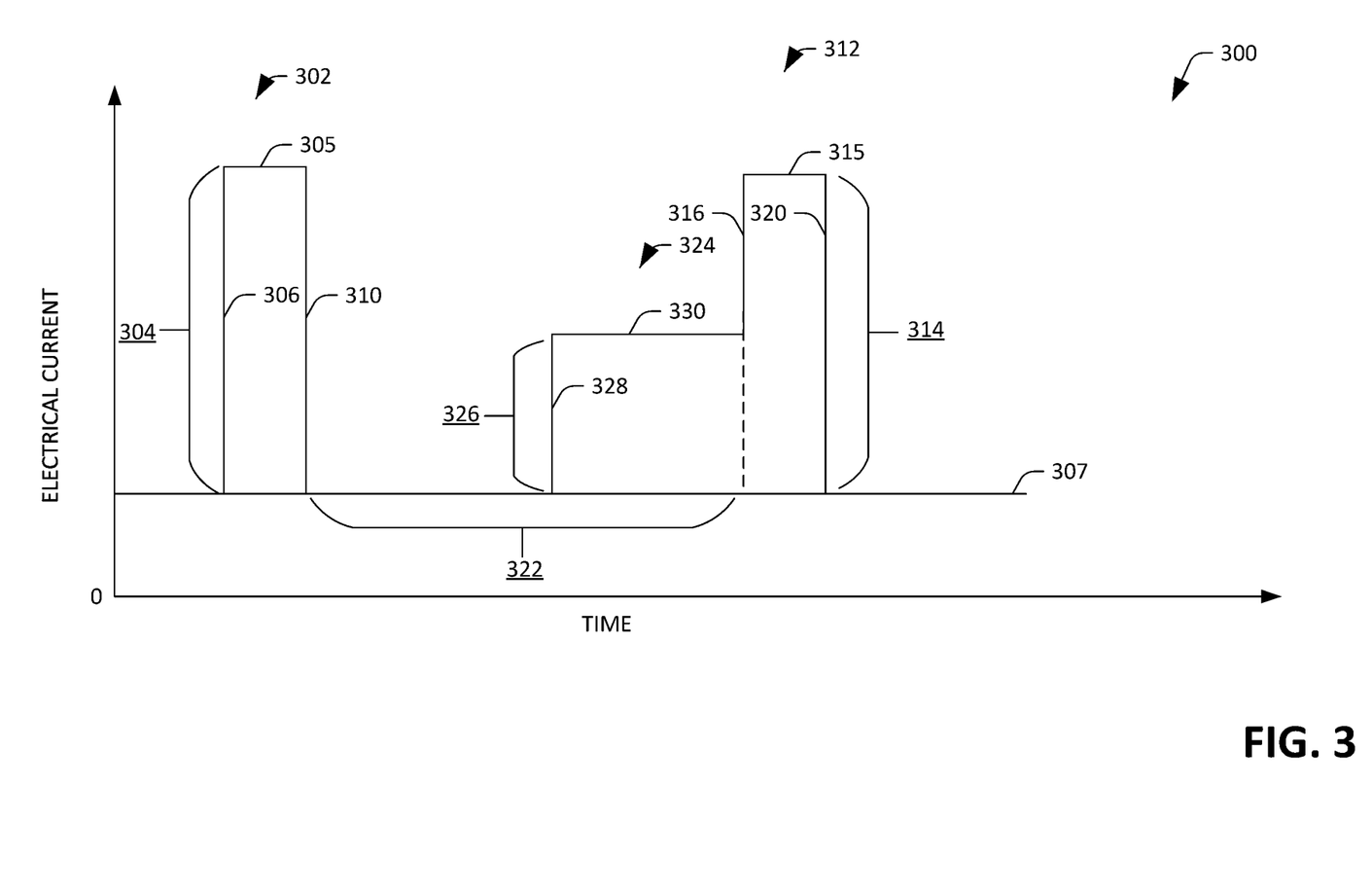
FIG. 3 is a plot illustrating a porch pulse that is prepended to a current pulse.

Turning now to FIG. 3, an exemplary plot 300 of current pulses that can be output by the pulse circuitry 204 is illustrated. In the plot 300, the x-axis corresponds to time and the y-axis corresponds to amplitude of electrical current. Although leading and trailing edges of the current pulses in the plot 300 are depicted as vertical lines in FIG. 3 for ease of illustration, it is to be understood that the leading and the trailing edges may have associated rise and fall times (i.e., changes in current amplitude are not instantaneous). Furthermore, although FIG. 3 is referenced below to illustrate operation of the display system 200, it is to be understood that such references are for purposes of illustration only and are not to be construed as limiting.

Referring concurrently to FIGS. 2 and 3, operation of the display system 200 is now set forth. The display system 200 can be configured to display video imagery on the display surface 110. As such, the control circuitry 210 may receive a first indication from an external source (not shown in FIG. 2) indicating that a first pulse of light is to be emitted by the pulsed laser 206. For instance, the first indication may comprise a desired luminance of the first pulse of light. Based upon the first indication, the control circuitry 210 controls the pulse circuitry 204 to transmit a first current pulse 302 to the pulsed laser 206. The first current pulse 302 has an amplitude represented by reference number 304 and a first duration represented by reference numeral 305. As depicted in the plot 300, the first current pulse 302 comprises a leading edge 306 at which the electrical current increases from a bias current 307 of the pulsed laser 206 to the amplitude 304 and a trailing edge 310 at which the amplitude of the electrical current decreases, wherein the first current pulse 302 has the amplitude 302 for the duration 305 between the leading edge 306 and the trailing edge 310. While not shown in FIG. 3, the first current pulse 302 may have a porch pulse prepended thereto (based upon pulse spacing between the first current pulse 302 and a previously emitted current pulse).

The pulsed laser 206 receives the first current pulse 302 and emits the first pulse of light based upon the first current pulse 302, wherein the first pulse of light is directed towards the mirror 208, which in turn directs the first pulse of light towards a desired (pixel) location on the display surface 110. The first pulse of light has (approximately) the desired luminance specified in the first indication, the luminance being based upon the amplitude 304. A first pixel in a frame of the video imagery has a color and luminance based upon the first pulse of light.

The control circuitry 210 may receive a second indication from the external source (not shown in FIG. 2) indicating that a second pulse of light is to be emitted by the pulsed laser 206. For instance, the second indication may comprise a desired luminance of the second pulse of light. As depicted in the plot 300, a second current pulse 312 is to have an amplitude represented by reference numeral 314 and a second duration represented by reference numeral 315, wherein the amplitudes and durations of the current pulses 302 and 312 may be the same or different. Similar to the first current pulse 302, the second current pulse 312 comprises a leading edge 316 at which electrical current increases to the amplitude 314 and a trailing edge 320 at which electrical current decreases from the amplitude 314 to the bias current 307, wherein the second current pulse 312 has the amplitude 314 over the duration 315 of the second current pulse 312.

A pulse spacing 322 exists between the first current pulse 302 and the second current pulse 312. The first circuit logic 212 receives a value for the pulse spacing 322 (the amount of time between the trailing edge 310 of the first current pulse 302 and the leading edge 316 of the second current pulse 312) and executes the return to bias rule, such that the value for the pulse spacing 322 is compared with the aforementioned threshold value. In this example, the first circuit logic 212 determines that the value for the pulse spacing 322 is above the threshold value, and outputs the value for the pulse spacing 322. Such output indicates that a porch pulse 324 is to be prepended to the second current pulse 302. If, however, the first circuit logic 212 determines that the value for the pulse spacing 322 is below the threshold value, the control circuitry 210 will control the pulse circuitry 204 such that there is no porch pulse prepended to the second current pulse 312.

Upon the first circuit logic 212 determining that the value for the pulse spacing 322 is above the threshold value, the value for the pulse spacing 322 is provided to at least one of the second circuit logic 214 or the third circuit logic 216 in order to compute at least one of an amplitude of the porch pulse 324 or a duration of the porch pulse 324 (as described above), wherein the computed amplitude and/or the computed duration are based upon the value for the pulse spacing 322. The porch pulse 324 can have an amplitude that is below a lasing threshold of the pulsed laser 206. Further, as described above, the second circuit logic 214 and/or the third circuit logic 216 can compute the duration and/or amplitude of the porch pulse based upon the estimated (current) junction temperature of the pulsed laser 206 as output by the temperature module 207.

In addition, the fourth circuit logic 218 can ensure that the computed amplitude output by the third circuit logic 216 does not exceed the amplitude 314 of the second current pulse 302. In the example shown in FIG. 3, amplitude 326 of the porch pulse 324 does not exceed the amplitude 304 of the second current pulse 312, and therefore the fourth circuit logic 218 does not alter the amplitude of the porch pulse 324. If, however, the computed amplitude of the porch pulse 324 (output by the third circuit logic 316) is greater than the amplitude 304 of the second current pulse 312, the control circuitry 210 sets the amplitude 326 of the porch pulse 324 to be equal to the amplitude 314 of the second current pulse 312.

The control circuitry 210 controls the pulse circuitry 204 such that the pulse circuitry 204 transmits the porch pulse 324 to the pulsed laser 206 subsequent to transmitting the first current pulse 302 to the pulsed laser 206 and prior to the pulse circuitry transmitting the second current pulse 312 to the pulsed laser. The porch pulse 324, in the example illustrated in FIG. 3, has the at least one of the computed amplitude or the computed duration. For instance, the porch pulse 324 may have the computed amplitude and the computed duration, the computed amplitude and a predetermined duration, or a predetermined amplitude and the computed duration. In the plot 300, the porch pulse 324 has the (computed or predetermined) amplitude 326. Furthermore, the porch pulse 324 has a porch leading edge 328 that extends from the bias current 307 of the pulsed laser 206 to the amplitude 326 of the porch pulse 324. The porch pulse 324 also has a duration 330 that extends from the leading edge 328 of the porch pulse to the leading edge 316 of the second current pulse, wherein the porch pulse 324 has the amplitude 326 for the duration 330 of the porch pulse 324 (wherein the amplitude 326 is above the bias current 307 of the pulsed laser 206). Although the porch leading edge 328 is depicted as a vertical line in the plot 300, it is to be understood that the control circuitry 210 may cause the pulse circuitry 204 to increase electrical current over time from the bias current 307 of the pulsed laser 206 to the amplitude 326 of the porch pulse 324 to avoid high frequency optical artifacts caused by a discontinuous introduction of the porch pulse 324. Stated another way, the porch pulse 324 has an associated rise time at which electrical current rises from the bias current 307 of the pulsed laser 206 to the amplitude 326.

Immediately subsequent to causing the pulse circuitry 204 to transmit the first current pulse 302, the control circuitry 210 causes current transmitted to the pulsed laser 206 to return to the bias current 207 until the leading edge 328 of the porch pulse 324. The amount of time that the current transmitted to the pulsed laser 206 is at the bias current 307 is the value for the pulse spacing 322 less the duration 330 of the porch pulse 324. Again, the porch pulse 324 is prepended to the second current pulse 312 in order to reduce an amount of time to reach a lasing threshold of the pulsed laser 206 when the pulsed laser 206 is provided with the second current pulse 312.

In operation, the pulsed laser 206 receives the first current pulse 302, the porch pulse 324, and the second current pulse 312, and emits the second pulse of light based upon the porch pulse 324 and the second current pulse 312, wherein the second pulse of light is directed towards the mirror 208, which in turn directs the second pulse of light towards a desired (pixel) location on the display surface 110. The second pulse of light has (approximately) the desired luminance specified in the second indication. A second pixel in a frame of the video imagery has a color and luminance based upon the second pulse of light. In an example, the second pixel may be adjacent to the first pixel. The aforementioned steps may be repeated such that pixels on the display surface 110 have desired color and luminance.

Figure 4:
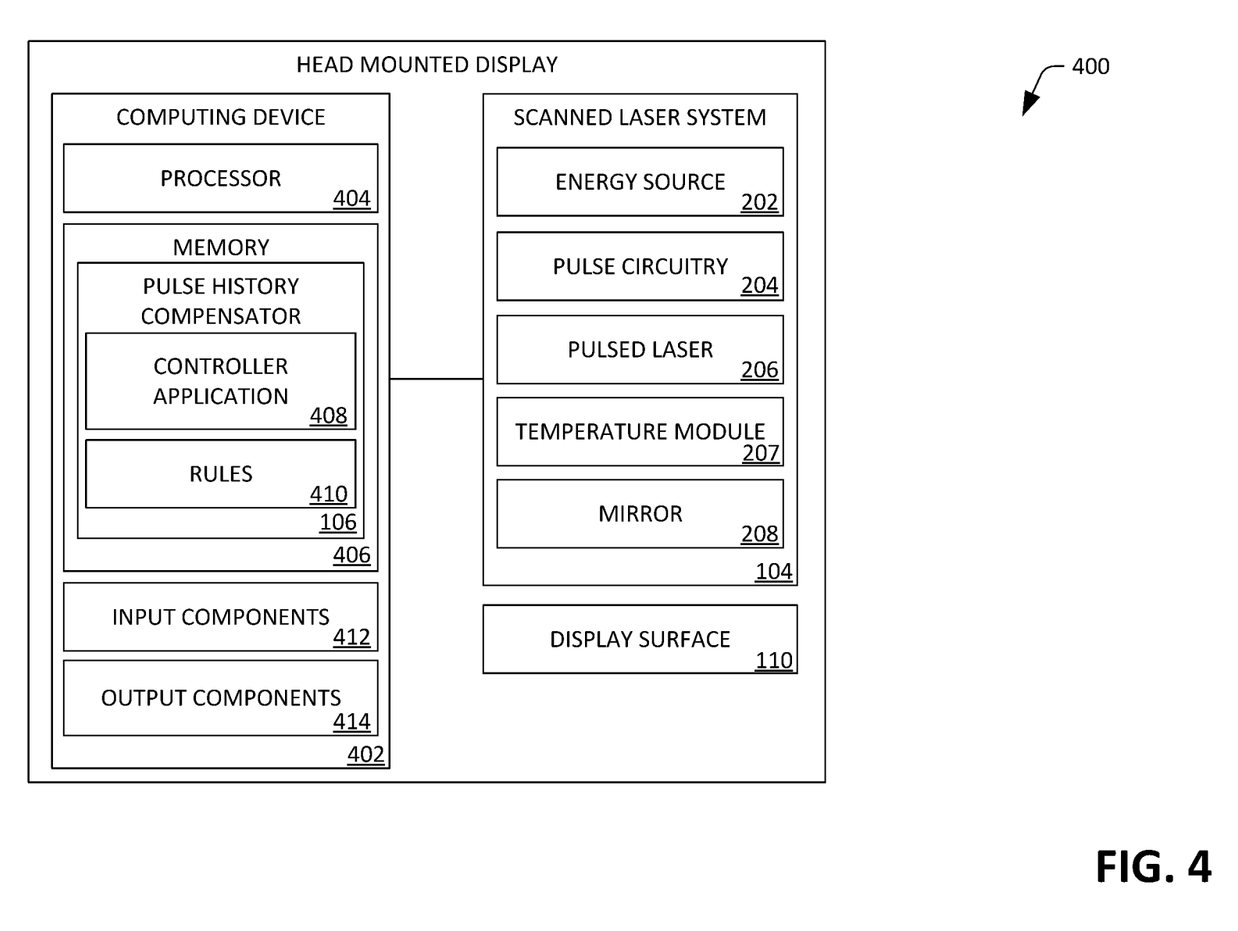
FIG. 4 is a functional block diagram of an exemplary display system that accounts for pulse history effects inherent to pulsed lasers.

Referring now to FIG. 4, a functional block diagram of an exemplary head mounted display 400 is illustrated, wherein elements of the head mounted display are configured to account for pulse history effects of scanned laser systems. The head mounted display 400 may be a head-mounted device worn over eyes of a user. For instance, the head mounted display 400 may be VR headset or an AR headset. The head mounted display 400 comprises a computing device 402, the scanned laser system 104 and its respective components, and the display surface 110. The computing device 402 is in communication with the scanned laser system 104. The computing device 402 comprises a processor 404 and memory 406, wherein the memory 406 has the pulse history compensator 106 loaded therein. Hence, in the embodiment depicted in FIG. 4, the pulse history compensator 106 can be implemented in a general-purpose processor, a microprocessor, a microcontroller, etc. In another example, the pulse history compensator 106 can be implemented in programmable logic in a field programmable gate array (FPGA).

In the head mounted display 400, the pulse history compensator 106 includes a controller application 408 and rules 410 loaded therein. The controller application 408, when executed by the processor 404, is configured to control the pulse circuitry 204 of the scanned laser system 104 to output a current pulse that has a desired amplitude, pulse width, rise time, fall time, etc. The controller application 408 is further configured to compute parameters of a porch pulse based upon the rules 410 and to cause the pulse circuitry 204 to transmit the porch pulse to the pulsed laser 206 such that the porch pulse is prepended to a current pulse transmitted by the pulse circuitry 204 to the pulsed laser 206. The rules 410 include at least one of the return to bias rule, the porch duration rule, the porch amplitude rule, or the low light rule, described above as being performed by the first circuit logic 212, the second circuit logic 214, the third circuit logic 216, and the fourth circuit logic 218, respectively.

The computing device 402 further includes input components 412 that enable the computing device 402 to receive input from a user of the head mounted display 400 and/or from surroundings of the head mounted display 400. For instance, the input components 412 may include a camera, a video camera, buttons, a handheld controller, a microphone, a mouse, a keyboard, a trackpad, a scroll wheel, etc. The computing device 402 also includes output components 414 that enable the user of the head mounted display 400 to experience sensory experiences. For instance, the output components 414 may include speakers, devices that provide tactile feedback, etc. Although not depicted in FIG. 4, the scanned laser system 104 (and its respective components) and the display surface 110 may be considered to be part of the output components 414.

The head mounted display 400 operates in a manner similar to that of the display system 200. However, rather than parameters of current pulses being controlled by circuitry in an ASIC (e.g., the control circuitry 210), a microcontroller (or programmable hardware logic) is programmed with computer-executable instructions.

In operation, the controller application 408 causes the pulse circuitry 204 to output a first current pulse based upon electrical current drawn from the energy source 202. The pulsed laser 206 emits a first pulse of light based upon the first current pulse, wherein the first pulse of light is directed towards the display surface 110. Luminance of the first pulse of light is based upon an amplitude of the first current pulse. A first pixel is illuminated on the display surface 110 based on the first pulse of light, where brightness of the first pixel is based upon the luminance of the first pulse of light emitted by the pulsed laser 206. For instance, the first pixel may be part of a frame of the video imagery presented on the display surface 110.

The controller application 408 determines or receives an amount of time between a trailing edge of the first current pulse and a leading edge of a second current pulse that is to be transmitted to the pulsed laser 206 subsequent to the first current pulse being transmitted to the pulsed laser 206. The controller application 408 determines whether the amount of time is above or below a threshold value. When the computed amount of time is below the threshold value, the first current pulse (alone) provides sufficient pre-charging for the pulsed laser 206, and thus the controller application 408 causes the pulse circuitry 204 to transmit the second current pulse to the pulsed laser 206 without a porch pulse prepended thereto. The pulsed laser 206 emits a second pulse of light based upon the second current pulse, and as a result a second pixel of imagery is presented on the display surface 110 based upon the second pulse of light. For instance, the second pixel may be part of video imagery presented on the display surface 110.

However, when the computed amount of time is above the threshold value, the controller application 408 computes at least one of an amplitude of a porch pulse or a duration of the porch pulse based upon the amount of time between the trailing edge of the first current pulse and the leading edge of the second current pulse that is to be transmitted to the pulsed laser 206. Additionally or alternatively, the controller application 408 may also compute the at least one of the amplitude of the porch pulse or the duration of the porch pulse based upon an estimated temperature at a junction of the pulsed laser 206 generated by the temperature module 207 of the scanned laser system 104. The porch pulse is a current pulse that is to be transmitted by the pulse circuitry 204 subsequent to transmitting the first current pulse but prior to transmitting the second current pulse. The porch pulse is to have at least one of the computed amplitude or the computed duration, wherein the computed amplitude is above a bias current of the pulsed laser 206. The controller application 408 may perform a comparison between the computed amplitude of the porch pulse and an amplitude of the second current pulse that is to be transmitted to the pulsed laser 206. When the computed amplitude of the porch pulse is greater than the amplitude of the second current pulse, the controller application 408 sets the amplitude of the porch pulse to be equal to the amplitude of the second current pulse. When the computed amplitude of the porch pulse is less than the amplitude of the second current pulse, the controller application 408 sets the amplitude of the porch pulse to be equal to the computed amplitude. The controller application 408 causes the pulse circuitry 204 to transmit the porch pulse to the pulsed laser 206, wherein the porch pulse is prepended to the second current pulse.

The controller application 408 causes the pulse circuitry 204 to transmit the second current pulse to the pulsed laser 206 immediately subsequent to the pulse circuitry 204 transmitting the porch pulse to the pulsed laser 206. The pulsed laser 206 emits the second pulse of light based upon the porch pulse and the second current pulse, and as a result the second pixel of imagery is presented on the display surface 110 based upon the second pulse of light. For instance, the second pixel may be part of video imagery presented on the display surface 110.

Figure 5:
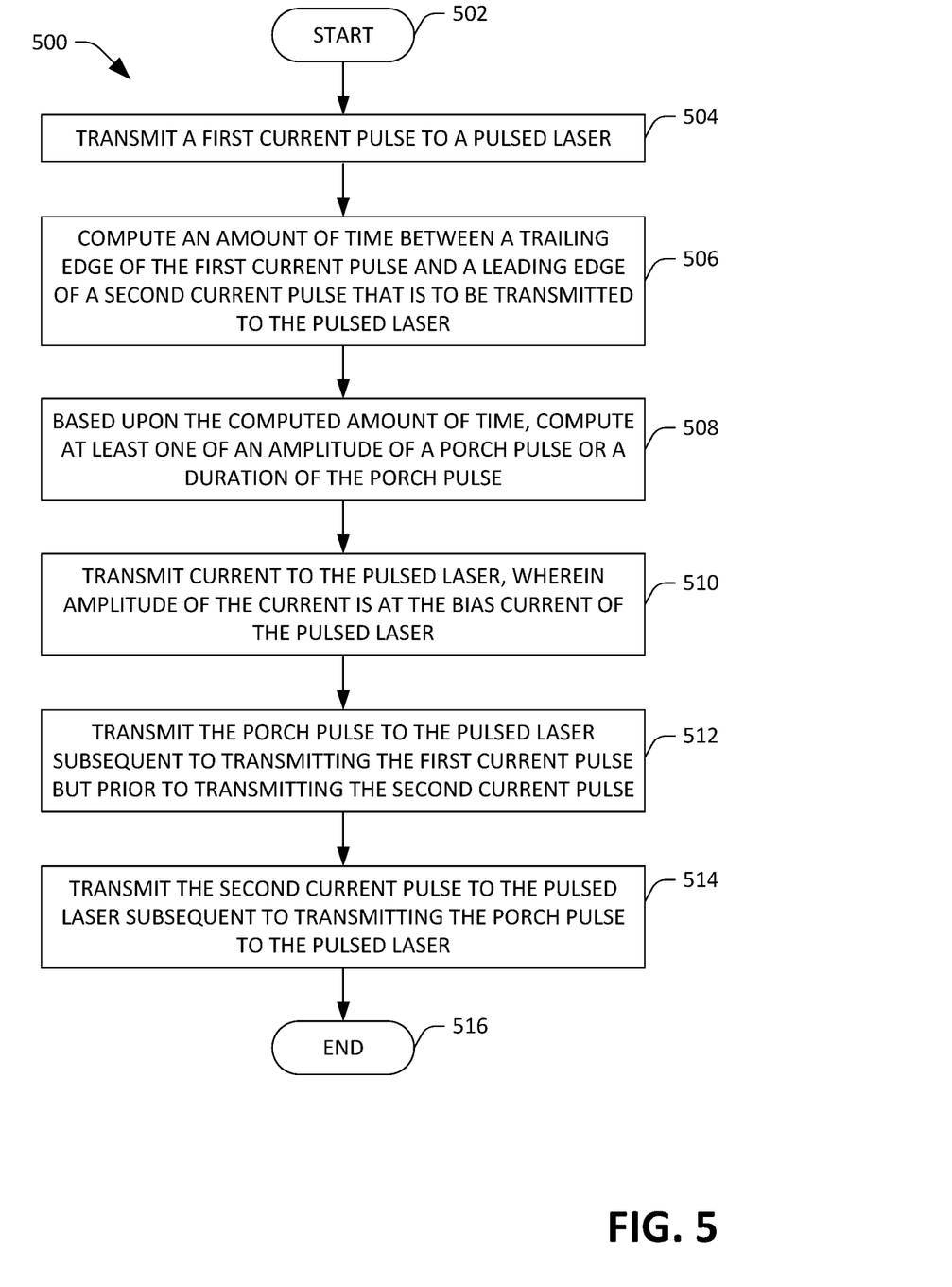
FIG. 5 is a flow diagram that illustrates an exemplary methodology performed by a display system that facilitates accounting for pulse history effects when outputting pulses of light.
Figure 6:
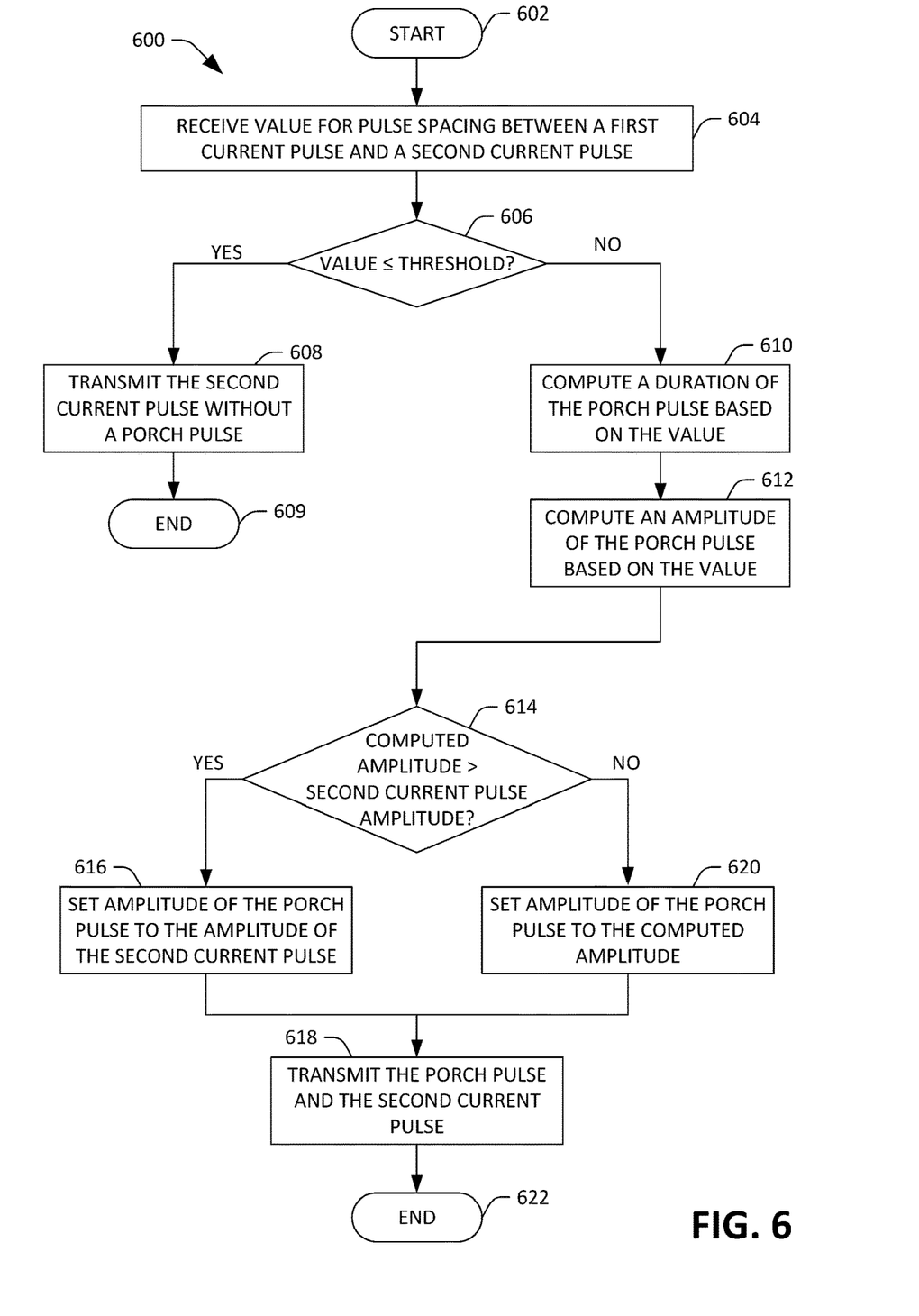
FIG. 6 is a flow diagram that illustrates an exemplary methodology performed by a display system for accounting for pulse history effects with respect to light that is output by a pulsed laser.

FIGS. 5 and 6 illustrate exemplary methodologies relating to compensating for pulse history effects in a scanned laser display. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like. In another example, one or more of the acts described herein may be performed by circuitry that is designed to perform such acts.

Referring now to FIG. 5, a methodology 500 performed by a display system that facilitates compensating for pulse history effects in a scanned laser display is illustrated. The methodology 500 begins at 502, and at 504, a first current pulse is transmitted to a pulsed laser in the scanned laser display. The pulsed laser emits a first pulse of light based upon the first current pulse and a first pixel of imagery is presented on a display surface based upon the first pulse of light. At 506, an amount of time between a trailing edge of the first current pulse and a leading edge of a second current pulse that is to be transmitted to the pulsed laser subsequent to the first current pulse being transmitted to the pulsed laser is computed.

At 508, based upon the computed amount of time between the trailing edge of the first current pulse and the leading edge of the second current pulse, at least one of an amplitude of a porch pulse or a duration of the porch pulse that is to be transmitted to the pulsed laser is computed. The computed amplitude for the porch pulse is above a bias current of the pulsed laser. At 510, immediately subsequent to the first current pulse being transmitted to the pulsed laser, amplitude of current transmitted to the pulsed laser is set to the bias current of the pulsed laser. At 512, the porch pulse is transmitted to the pulsed laser. The porch pulse has the at least one of the computed amplitude or the computed duration. At 514, the second current pulse is transmitted to the pulsed laser subsequent to the porch pulse being transmitted to the pulsed laser, such that the porch pulse is prepended to the second current pulse. The pulsed laser emits a second pulse of light based upon the porch pulse and the second current pulse, and a second pixel of imagery is presented on the display surface based upon the second pulse of light. The methodology 500 concludes at 516.

Turning now to FIG. 6, a methodology 600 that facilitates accounting for pulse history effects in a scanned laser display is illustrated, wherein the methodology 600 is performed by a display system. The methodology 600 begins at 602, and at 604, a value for pulse spacing between a first current pulse and a second current pulse is received, wherein the value for pulse spacing identifies an amount of time between a trailing edge of the first current pulse and a leading edge of the second current pulse. At 606, a determination is made as to whether the value for the pulse spacing is below a threshold value (e.g., 2.7 ns). Such determination can be made prior to the first current pulse being transmitted, while the first current pulse is being transmitted, or after the first current pulse is transmitted (but prior to the second current pulse being transmitted). At 608, when the value for the pulse spacing is less than or equal to the threshold value, the second current pulse is transmitted to the pulsed laser subsequent to the first current pulse being transmitted to the pulsed laser, wherein the second current pulse has no porch pulse prepended thereto, and further wherein the pulsed laser emits a first pulse of light based upon the first current pulse and a second pulse of light based upon the second current pulse. The methodology 600 subsequently concludes at 609.

When it is determined at 606 that the value for the pulse spacing between the first current pulse and the second current pulse is greater than the threshold value, at 610 a duration of a porch pulse (as described above, a current pulse that is to be prepended to the second current pulse) is computed based upon the value for the pulse spacing. Generally, the larger the value for the pulse spacing, the larger the duration of the porch pulse (up to a maximum threshold value of, for example, 7 ns). At 612, an amplitude of the porch pulse is computed based upon the value for the pulse spacing. Generally, the larger the value for the pulse spacing, the larger the amplitude of the porch pulse (up to a maximum threshold value of, for example, 18 mA). Further, the porch pulse can be configured to have a rise time such that amplitude of the porch pulse ramps up over time (e.g., 15 mA per 1 ns), rather than discontinuously jumping from the bias current to the computed amplitude. In another example, however, the porch pulse can have a small of a rise time as possible.

At 614, a determination is made as to whether the computed amplitude of the porch pulse is greater than an amplitude of the second current pulse. At 616, when the computed amplitude of the porch pulse is greater than the amplitude of the second current pulse, an amplitude of the porch pulse is set to be equal to the amplitude of the second current pulse. At 618, the porch pulse (having the amplitude equal to the amplitude of the second current pulse) and the second current pulse to the pulsed laser are transmitted to the pulsed laser, wherein the porch pulse is prepended to the second current pulse, and further wherein the pulsed laser emits a pulse of light based upon the porch pulse and the second current pulse.

When it is determined at 614 that the computed amplitude of the porch pulse is not greater than the amplitude of the second current pulse, an amplitude of the porch pulse is set to the computed amplitude. The methodology 600 then proceeds to 618, where the porch pulse (having the computed amplitude) and the second current pulse are transmitted to the pulsed laser, wherein the porch pulse is prepended to the second current pulse, and further wherein the pulsed laser emits a pulse of light based upon the porch pulse and the second current pulse. The methodology 600 concludes at 622.

EXAMPLES

To illustrate application of the above-described technologies, experiments were performed using a Red Sharp DV Sharp™ laser, a Green Sharp DV Sharp™ laser, and a Blue Sharp DV Sharp™ laser. Luminance output by each of the lasers at different electrical current values at a temperature of 25° C., with pulse spacings varying from 1.8 ns to 30.8 ns, and with 0.6 Ith values was recorded.

Figure 7:
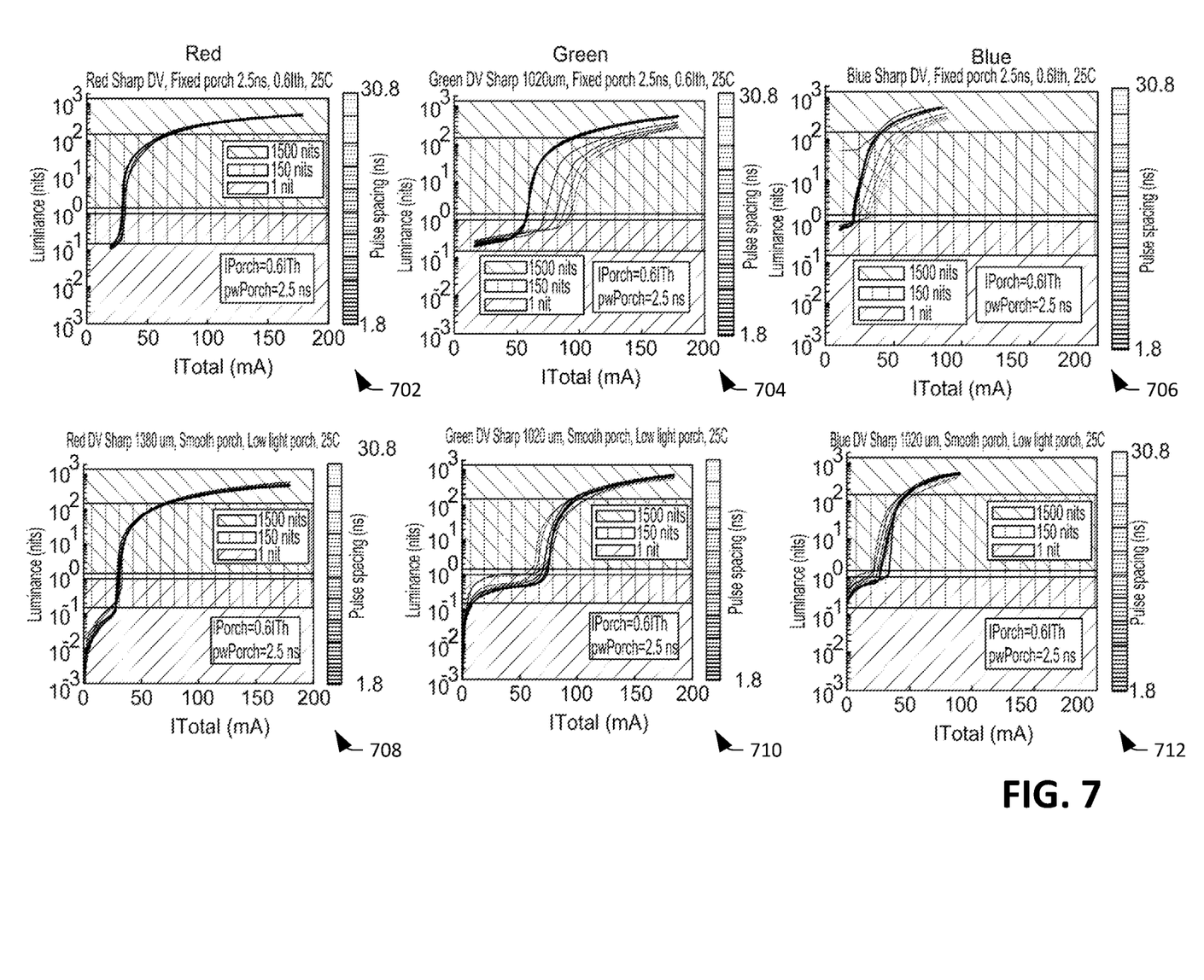
FIG. 7 illustrates various plots of luminance versus electrical current.

Referring now to FIG. 7, various plots 702-712 demonstrating results of the experiments are illustrated. Plots 702-706 are indicative of control experiments performed using the red, green, and blue lasers, respectively, whereby a fixed porch pulse duration of 2.5 ns was utilized. Plots 708-712 are indicative of experiments performed utilizing the red, green, and blue lasers, respectively, whereby the rules discussed above were executed in order to compute parameters of a porch pulse. A comparison of the plots 700 indicates that the above-described technologies extend dynamic range for each of the lasers and reduce pulse history effects on light output by the lasers, particularly with respect to the green and blue lasers (as evidenced, for example, by the closer clustering of the curves in plot 710 and plot 712).

Figure 8:
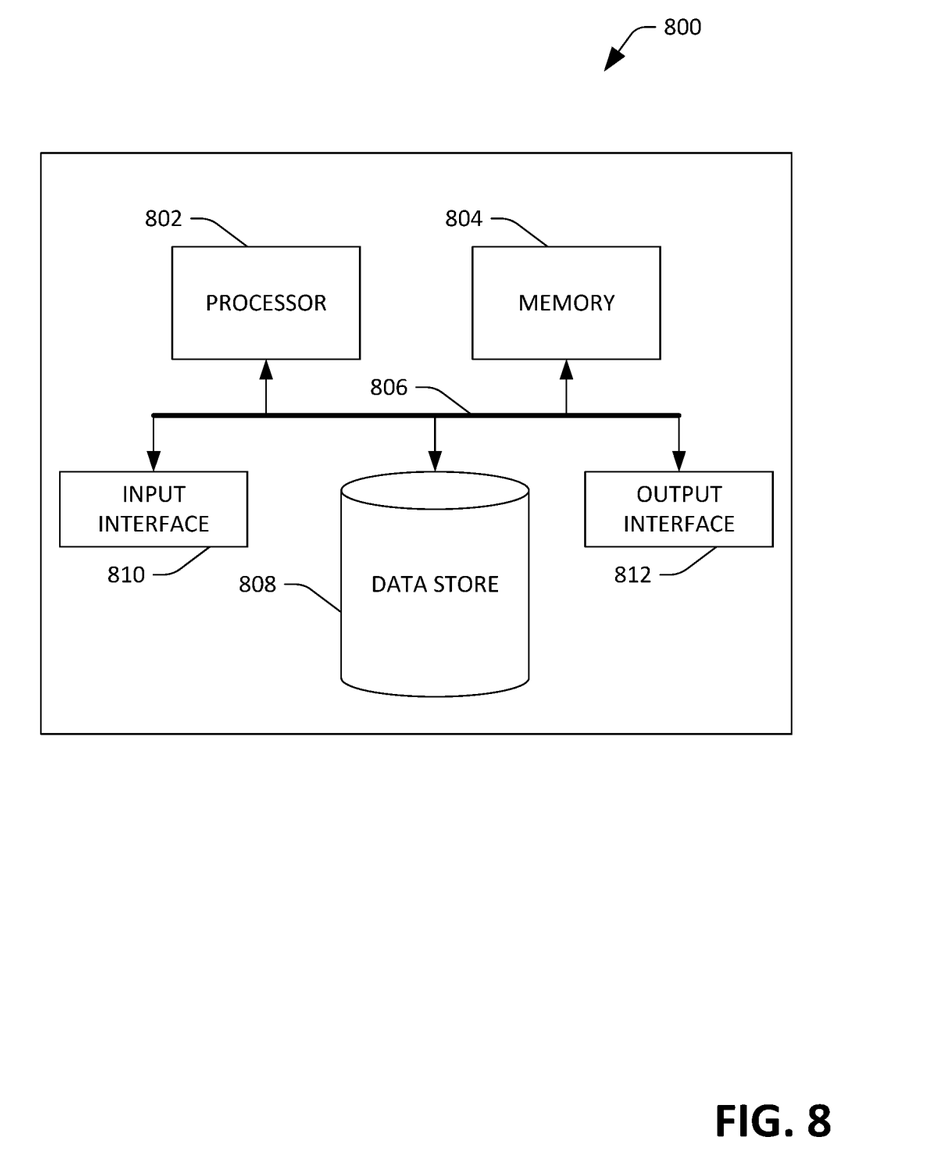
FIG. 8 is an exemplary computing device.

Referring now to FIG. 8, a high-level illustration of an exemplary computing device 800 that can be used in accordance with the systems and methodologies disclosed herein is illustrated. For instance, the computing device 800 may be used in a system that compensates for pulse history effects on pulses of light emitted by a pulsed laser. By way of another example, the computing device 800 can be used in a system that outputs light on a display surface in connection with presenting video imagery on the display surface. The computing device 800 includes at least one processor 802 that executes instructions that are stored in a memory 804. The instructions may be, for instance, instructions for implementing functionality described as being carried out by one or more components discussed above or instructions for implementing one or more of the methods described above. The processor 802 may access the memory 804 by way of a system bus 806. In addition to storing executable instructions, the memory 804 may also store rules and parameters of current pulses, such as amplitude, duration, rise time, fall time, etc.

The computing device 800 additionally includes a data store 808 that is accessible by the processor 802 by way of the system bus 806. The data store 808 may include executable instructions, rules, and parameters of current pulses, such as amplitude, duration, rise time, fall time, etc. The computing device 800 also includes an input interface 810 that allows external devices to communicate with the computing device 800. For instance, the input interface 810 may be used to receive instructions from an external computer device, from a user, etc. The computing device 800 also includes an output interface 812 that interfaces the computing device 800 with one or more external devices. For example, the computing device 800 may display text, images, etc. by way of the output interface 812.

It is contemplated that the external devices that communicate with the computing device 800 via the input interface 810 and the output interface 812 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 800 in a manner free from constraints imposed by input devices such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 800 may be a distributed system. Thus, for instance, several devices may be in communication by way of a network connection and may collectively perform tasks described as being performed by the computing device 800.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise random-access memory (RAM), read-only memory (ROM), electrically erasable programmable read-only memory (EEPROM), compact disc read-only memory (CD-ROM) or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionality described herein can be performed, at least in part, by one or more hardware logic components. For example, and without limitation, illustrative types of hardware logic components that can be used include FPGAs, ASICs, Application-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. An augmented reality (AR) or virtual reality (VR) headset comprising:
    a laser;
    a display surface, where output of the laser is projected onto the display surface;
    a current source that provides current pulses to the laser, wherein the laser outputs light based upon the current pulses; and
    control circuitry that is operably coupled to the current source, wherein the control circuitry is configured to:
        based upon an amount of time between a trailing edge of a first current pulse and a leading edge of a second current pulse, causing the current source to output a stepped current pulse to the laser, where the stepped current pulse comprises the second current pulse and a porch pulse that immediately precedes the second current pulse, where the stepped current pulse is configured to account for pulse history effects associated with the laser.

2. The AR or VR headset of claim 1, wherein the laser emits pulses of light based upon the current pulses provided to the laser by the current source.

3. The AR or VR headset of claim 1, wherein the stepped current pulse comprises:
    the porch pulse that is provided to the laser during a first time window that is bounded by a leading edge of the porch pulse and the leading edge of the second current pulse, the porch pulse of the stepped current pulse having a first amplitude; and
    the second current pulse that is provided to the laser during a second time window that is bounded by the leading edge of the second current pulse and a trailing edge of the second current pulse, wherein the second time window is subsequent to the first time window, and further wherein the second current pulse has a second amplitude that is greater than the first amplitude.

4. The AR or VR headset of claim 3, wherein the first time window has a length that is greater than the second time window.

5. The AR or VR headset of claim 3, wherein the first time window has a length that is less than the second time window.

6. The AR or VR headset of claim 3, wherein the control circuitry computes the first amplitude based upon the amount of time between the trailing edge of the first current pulse stepped pulse and the leading edge of the second current pulse.

7. The AR or VR headset of claim 3, wherein the control circuitry causes the current source to provide the laser with the stepped current pulse only after determining that the amount of time between the trailing edge of the first current pulse and the leading edge of the second current pulse is above a predefined threshold.

8. The AR or VR headset of claim 3, wherein the control circuitry computes the first amplitude based upon an estimated junction temperature of the laser.

9. The AR or VR headset of claim 3, wherein the control circuitry causes the current source to provide current to the laser at a bias current of the laser.

10. The AR or VR headset of claim 1, wherein video is presented on the display surface based upon the light emitted by the laser.

11. The AR or VR headset of claim 1, further comprising at least one of a battery or a photovoltaic cell, wherein the current source is provided with energy by the at least one of the battery or the photovoltaic cell.

12. The AR or VR headset of claim 1, further comprising a second laser, wherein the laser outputs light of a first color towards the display surface and the second laser outputs light of a second color towards the display surface, and further wherein the control circuitry causes the current source to provide the second laser with a second stepped current pulse to account for pulse history effects in the second laser.

13. The AR or VR headset of claim 1, further comprising a thermal probe that is positioned proximate to a junction of the laser, wherein control circuitry causes the current source to provide the laser with the stepped current pulse based upon output of the thermal probe.

14. An augmented reality (AR) or virtual reality (VR) headset comprising:
   an energy source from which electrical current is drawn;
   pulse circuitry that is configured to:
      receive the electrical current drawn from the current source; and
      transmit current pulses based upon the electrical current drawn from the current source;
   a pulsed laser that is configured to:
      receive the current pulses transmitted by the pulse circuitry; and
      emit pulses of light in connection with presenting imagery on a display surface, wherein the pulses of light are based upon amplitudes of the current pulses; and
   control circuitry that is configured to cause the pulse circuitry to transmit a stepped current pulse to the pulsed laser to account for pulse history effects caused by the pulsed laser receiving at least one current pulse prior to the pulsed laser receiving the stepped current pulse, wherein the stepped current pulse comprises a porch pulse that immediately precedes a current pulse, and further wherein an amplitude of the porch pulse is computed by the control circuitry based upon an amount of time between a trailing edge of the at least one current pulse and a leading edge of the current pulse.

15. The AR or VR headset of claim 14, wherein the control circuitry is configured to cause the pulse circuitry to transmit several stepped current pulses to the pulsed laser.

16. The AR or VR headset of claim 14, wherein a duration of the porch pulse is further computed by the control circuitry based upon the amount of time between the trailing edge of the at least one current pulse and the leading edge of the current pulse.

17. The AR or VR headset of claim 14, further comprising a second pulsed laser, wherein the control circuitry is configured to cause the pulse circuitry to transmit a second stepped current pulse to the second pulse layer to account for second pulse history effects caused by the second pulsed laser receiving another current pulse prior to the pulsed laser receiving the stepped current pulse.

18. The AR or VR headset of claim 14, wherein the control circuitry is configured to cause the pulse circuitry to provide current to the pulsed laser at a bias current of the pulsed laser immediately subsequent to providing the stepped pulse to the pulsed laser.

19. A method performed by an augmented reality (AR) or virtual reality (VR) headset, the method comprising:
   receiving an amount of time between a trailing edge of a first current pulse and a leading edge of a second current pulse, wherein the first current pulse is to be transmitted to a pulsed laser followed by the second current pulse being transmitted to the pulsed laser;
   based upon the received amount of time between the trailing edge of the first current pulse and the leading edge of the second current pulse, transmitting a stepped pulse to the pulsed laser, where the stepped pulse comprises the second current pulse and a porch pulse that immediately precedes the second current pulse, wherein the porch pulse is configured to account for pulsed history effects associated with the pulsed laser; and
   emitting, by the pulsed laser, a pulse of light based upon the stepped current pulse, wherein imagery is presented on a display surface of the AR or VR headset based upon the pulse of light emitted by the pulsed laser.

20. The method of claim 19, further comprising computing at least one of an amplitude or duration of the porch pulse based upon the received amount of time, wherein the stepped current pulse is based upon the at least one of the amplitude or the duration of the porch pulse.

* * * * *